United States Patent [19]

Inoue et al.

[11] Patent Number: 4,820,146

[45] Date of Patent: Apr. 11, 1989

[54] SUPER HARD ALLOY DIES FOR EXTRUDING HONEYCOMB STRUCTURES

[75] Inventors: Satoru Inoue, Hazu; Shoji Futamura, Kawasaki, both of Japan

[73] Assignees: NGK Insulators, Ltd., Nagoya; Institute of Technology Precision Electrical Discharge Works, Kawasaki, both of Japan

[21] Appl. No.: 84,026

[22] Filed: Aug. 11, 1987

[30] Foreign Application Priority Data

Aug. 14, 1986 [JP] Japan .................. 61-190745

[51] Int. Cl.⁴ ............................................. B29C 47/12
[52] U.S. Cl. ................... 425/461; 264/177.12; 264/209.1; 264/209.8; 425/462; 425/464
[58] Field of Search .............. 264/177.12, 209.8, 173, 264/177.11, 209.1; 420/440, 448, 460; 425/183, 461, 462, 463, 464, 465, 197, 198, 199; 428/908.8

[56] References Cited

U.S. PATENT DOCUMENTS

| | | | |
|---|---|---|---|
| 4,118,456 | 10/1978 | Blanding et al. | 264/177.12 |
| 4,167,386 | 9/1979 | Mallay | 425/463 |
| 4,373,895 | 2/1983 | Yamamoto et al. | 425/461 |
| 4,465,454 | 8/1984 | Duerr et al. | 425/461 |
| 4,653,996 | 3/1987 | Ozaki et al. | 425/464 |
| 4,681,062 | 7/1987 | Shibata et al. | 118/407 |
| 4,687,433 | 8/1987 | Ozaki et al. | 264/177.12 |

FOREIGN PATENT DOCUMENTS 3521883  12/1985  Fed. Rep. of Germany .

Primary Examiner—Jay H. Woo
Assistant Examiner—C. Scott Bushey
Attorney, Agent, or Firm—Parkhurst, Oliff & Berridge

[57] ABSTRACT

A honeycomb structure forming die has a forming section provided with at least forming channels and a plurality of opening holes. The forming channels have a sectional shape conforming to that of honeycomb structural bodies to be extruded by the die, and have a given depth from a front face of the die toward a rear face thereof. The opening holes are independently formed from the die rear face toward the die front face and communicate with the forming channels. The honeycomb structure forming die is further provided with communicating holes which communicate with the opening holes of the forming section.

8 Claims, 4 Drawing Sheets

FIG_1A
PRIOR ART
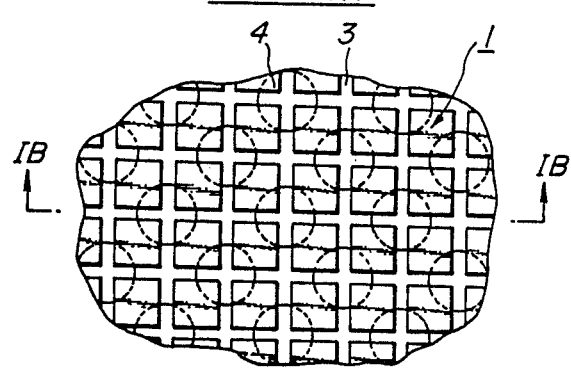
FIG_1B
PRIOR ART
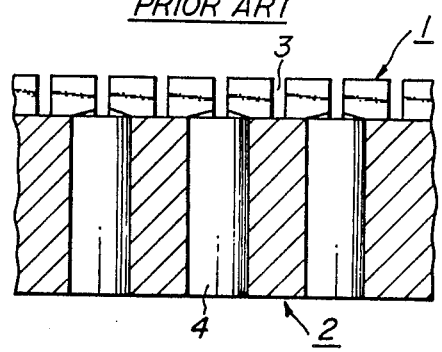
FIG_2
PRIOR ART
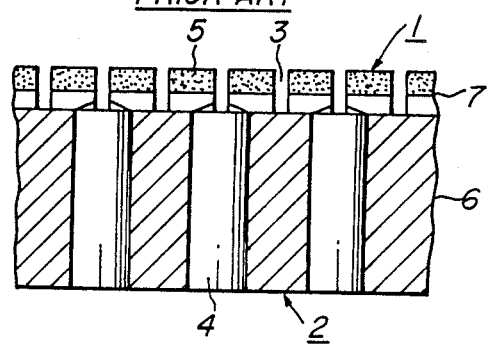

FIG_3A
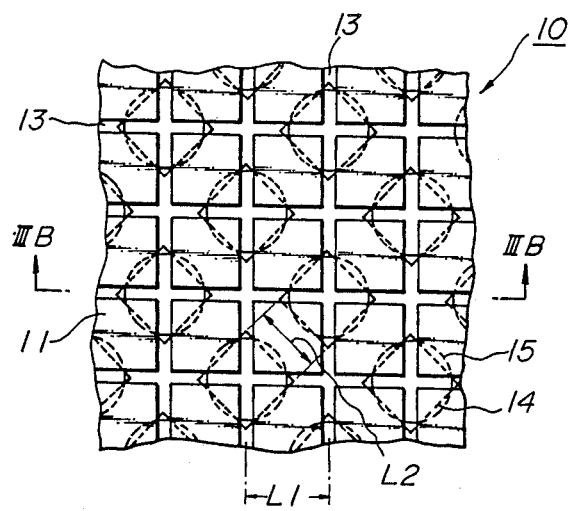
FIG_3B
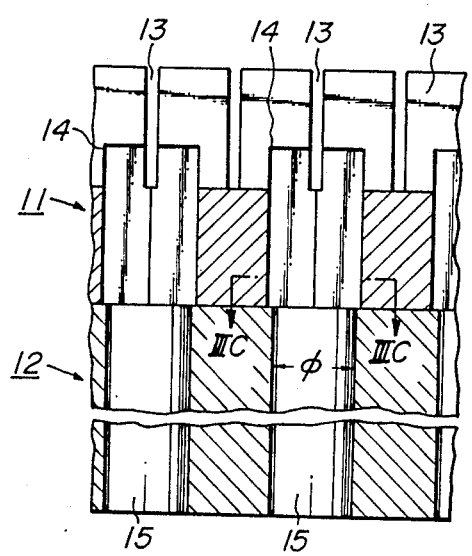
FIG_3C
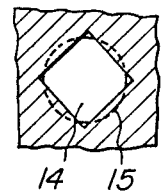

FIG_4A
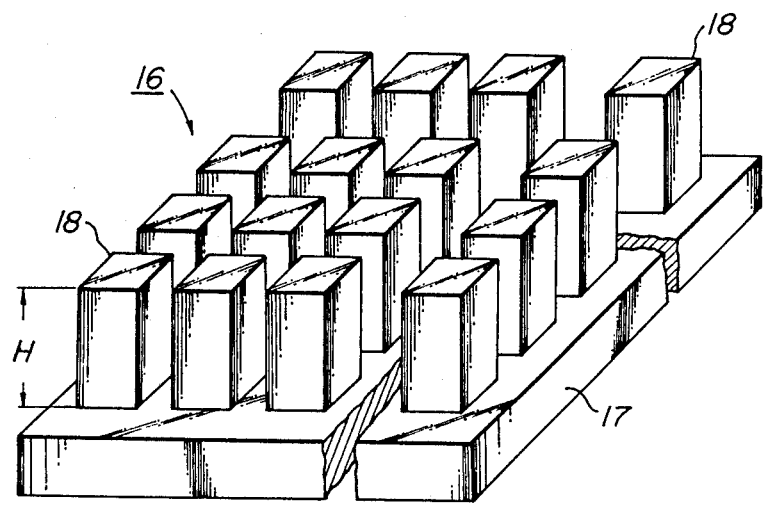
FIG_4B
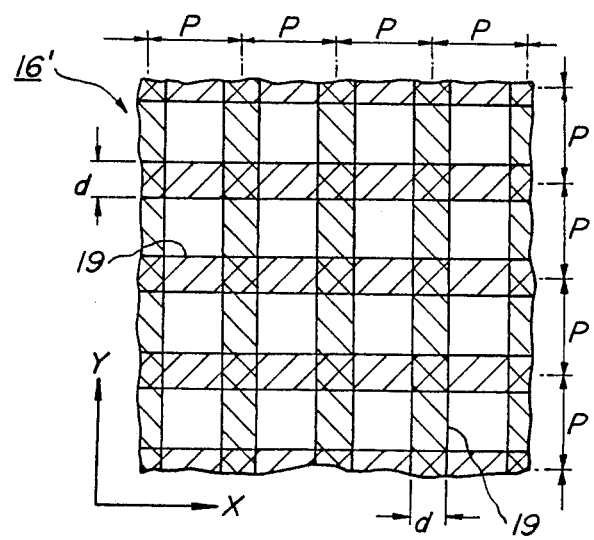

FIG_5A
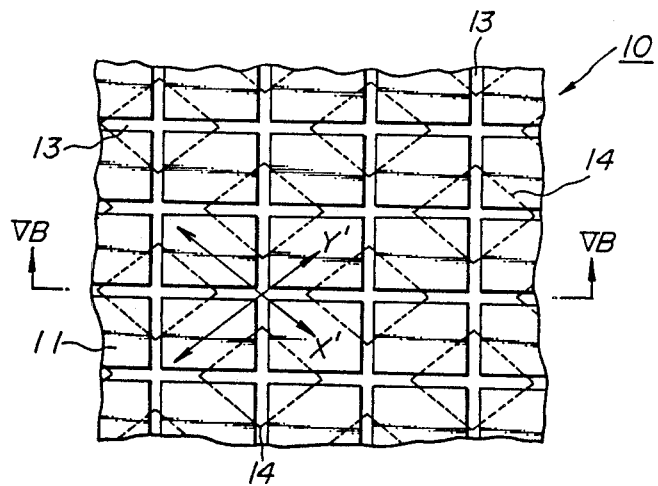
FIG_5B
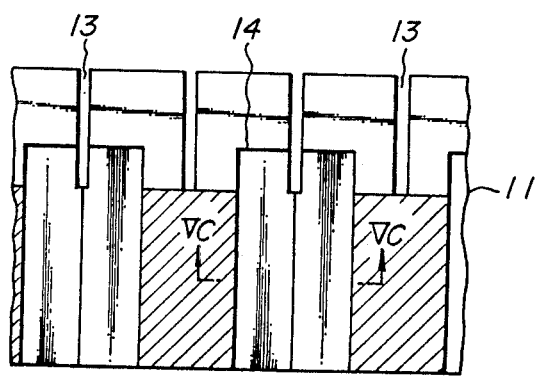
FIG_5C
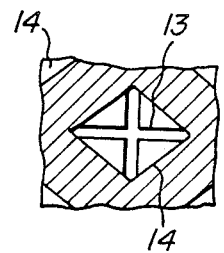

SUPER HARD ALLOY DIES FOR EXTRUDING HONEYCOMB STRUCTURES

BACKGROUND OF THE INVENTION (1) Field of the Invention:

The present invention relates to dies for extruding honeycomb structures and a method of manufacturing said dies. More particularly, the invention relates to honeycomb structure forming dies which are adapted to form honeycomb structural bodies through extruding a plastic material such as a ceramic material and comprise a forming section provided with forming channels and made of a wear resistive alloy such as a super hard alloy, wherein a plurality of opening holes which communicate with the above forming channels and to which the plastic material is press fed are machined in the forming section through electrical discharging machining. The invention also relates to a method for manufacturing such dies.

(2) Related Art Statement:

As pointed out by the prior art in U.S. Pat. No. 3,790,654, there has been known a honeycomb forming die as shown in FIG. 1 (FIG. 1A is a plan view of the honeycomb forming die and FIG. 1B is a sectional side view of the die shown in FIG. 1A as viewed from an arrow (IB-IB). More particularly, the honeycomb structure forming die shown in FIGS. 1A and 1B is of a so-called integral structure, and is provided with honeycomb structure forming channels 3 (hereinafter referred to briefly as "forming channels") extending from a front face 1 of the die toward a rear face 2 thereof in a specified depth and in a sectional shape conforming to that of honeycomb structural bodies to be extruded (in the example shown in FIG. 1, a square shape). The die is also provided with a plurality of opening holes 4 which are independently bored from the die rear face 2 toward the die front face 1 and communicated with the forming channels 3. A raw material of the honeycomb structural bodies to be extruded, for instance, a ceramic plastic material is press fed to all the above plural opening holes 4, and the press fed plastic material flows into the forming channels 3 while being squeezed. Then, the plastic material is continuously extruded into ceramic honeycomb structural bodies through the forming channels 3.

However, when honeycomb structural bodies are extruded by using such a conventional honeycomb structural die, the forming channels 3 are worn with the plastic material passing through the forming channels 3, so that the width of the channels becomes larger. Thus, this poses a problem that expensive dies must be repeatedly exchanged so as to always assure a dimensional precision of the honeycomb structural bodies. In particular, when honeycomb structural bodies are to be formed through extrusion by using an alumina base material, a silicon carbide base material, a mullite base material, etc. having high hardness, the forming channels 3 are greatly worn. Therefore, there is an undesirable problem that the life of the die becomes conspicuously shorter.

Under the circumstances, in order to solve the above-mentioned undesirable problems, the prior art U.S. Pat. No. 4,653,996 discloses dies for extruding honeycomb structural body as shown in FIG. 2 in which a super hard alloy plate 5 is bonded to a front face of the die 1 and forming channels 3 are formed in the super hard alloy plate 5. However, in the die illustrated in FIG. 2, a part of the forming channels 3 extend inside a die base portion 6, and opening holes 4 are formed in the die base portion 6. Since the die base portion is not made of a super hard alloy, the opening holes 4 and a part of the forming channels 3 extending in the die base portion 6 more conspicuously wear as compared with the forming channels 3 formed in the super hard alloy plate 5. In particular, when a wear degree of a portion of the opening holes 4 near the forming channels 3 and a portion of the forming channels 3 in the die base portion 6 becomes non-uniform, a speed at which a plastic material passes through the forming channels 3 partially varies. Accordingly, there exists an undesirable problem that extruded honeycomb structural bodies are deformed or cracked during firing thus resulting in honeycomb structural bodies which are easily broken. Hence, even though the super alloy plate 5 is highly resistant to wear, the use life of the die depends upon wear of the die portion 6.

SUMMARY OF THE INVENTION

It is therefore an object of the present invention to solve the above-mentioned problems, and to provide dies for honeycomb structures and a method for manufacturing such dies. The dies and the manufacturing process thereof according to the present invention are characterized in that the dies each comprise a forming section which is made of a wear resistive alloy and is formed with a plurality of forming channels having a sectional shape conforming to that of honeycomb structural bodies to be extruded and a plurality of opening holes communicating with the forming channels are machined in the shaping section through electrical discharge machining.

By so constructing, a structural strength of the honeycomb structure forming dies can be enhanced, and the use life thereof can be greatly prolonged.

These and other objects, advantages and features of the present invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1A and 1B and FIG. 2 are views illustrating conventional honeycomb structure forming dies;

FIGS. 3A through 3C are views illustrating an embodiment of the honeycomb structure forming die according to the present invention;

FIGS. 4A and 4B are views illustrating an electrical discharge machining electrode for use in machining opening holes in the embodiment shown in FIG. 3; and FIGS. 5A through 5C are views illustrating another embodiment of the honeycomb structure forming die according to the present invention.

DETAILED DESCRIPTION OF THE INVENTION

FIGS. 3A through 3C are views illustrating an embodiment of the honeycomb structure shaping die according to the present invention, FIG. 3A being a plan view, and FIGS. 3B and 3C being a side sectional view of FIG. 3A as taken along a line IIB—IIIB and a sectional view of FIG. 3B as taken along a line IIIC—IIIC, respectively. FIG. 4A is a perspective view of an electrical discharge machining electrode used for machining opening holes in the embodiment shown in FIGS. 3A to 3C. FIG. 4B is a view illustrating production of the electrical discharge machining electrode shown in FIG. 4A. FIG. 5 shows another embodiment of the honeycomb structure forming die according to the present invention.

The embodiment illustrated in FIGS. 3A through 3C is a honeycomb structure forming die (hereinafter referred to briefly as "die") for extruding honeycomb structural bodies having cells of a square shape. In FIGS. 3A to 3C, reference numerals 10, 11 and 12 are a die, a forming section and a die base portion, respectively. Reference numerals 13, 14 and 15 denote a forming channel, opening holes and a communicating hole, respectively.

The die 10 of FIG. 3 is constituted by bonding the die base portion 12 and the forming section 11 made of a super hard alloy material (for example, through brazing). A super hard alloy needs not be used as the die base portion 12, and an inexpensive and readily available metal such as an ordinary steel may be used therefor. In the forming section 11 are formed forming channels 13 conforming to a sectional shape of honeycomb structural bodies to be extruded and a plurality of opening holes 14, 14, . . . , communicating with the forming channels 13 through electrical discharge machining. In the embodiment illustrated in FIG. 3, in order to facilitate the production of the electrical discharge machining electrode used for machining the opening holes 14 (which will be explained later in connection with FIGS. 4A and 4B), the sectional shape of the opening holes 14 is designed square and an intersecting angle between a side of the square and the forming channels 13 is set at 45°. In the die base portion 12, communicating holes 15, 15, . . . are formed at locations corresponding to the respective opening holes 14, 14, . . . In the embodiment illustrated in FIGS. 3A to 3C, the communicating holes 15, 15 . . . are formed in a cylindrical shape. As shown in FIG. 3C, the inner diameter of the communicating holes 15 in the embodiment of FIG. 3 is designed slightly smaller than an orthogonal length of the opening holes 14. The former may be equal to the latter or equal to a length of the side of the square.

In the die according to the present invention as constructed above, since the forming channels 13 and the opening holes 14 are formed in the forming section 11 made of the super hard alloy, the forming channels 13 and the opening holes 14 are substantially prevented from wearing. For example, although the communicating holes 15 provided in the die base portion 12 made of the ordinary steel naturally wear, since the communicating holes 15 communicate with the shaping holes 13 through the opening holes 14, such that substantially no influence is asserted against the honeycomb structural bodies obtained by the die according to the present invention even when the communicating holes 15 wear. If the communicating holes 15 conspicuously wear, only the die base portion need be exchanged.

The above-explained embodiment of FIG. 3 is constituted corresponding to the conventional example shown in FIG. 2 explained in the beginning of the specification, that is, by the forming section 11 and the die base portion 12. However, the honeycomb structure forming die according to the present invention may be constituted by the forming section only without employing the die base portion 12 of the embodiment shown in FIG. 3. In this case, it may be considered that the opening holes 14 provided in the forming section 11 also function as the communicating holes 15.

Next, an example of the manufacturing process according to the present invention will concretely be explained with reference to FIGS. 3A through 3C and FIGS. 4A and 4B.

(i) First, a shaping section block and a die base portion block (not shown) having shapes corresponding to the shaping section 11 and the die base portion 12, respectively, are prepared. The shaping section block and the die base portion block are made of a super hard alloy and an ordinary steel, respectively.

(ii) Forming channels 13 and opening holes 14 are machined by electrical discharge-machining the shaping section block in a well known manner to obtain a forming section 11 as shown in FIG. 3. An electrical discharge machining electrode used for making the above forming channels has a shape conforming to the shaping channels 13 to be extruded, and the opening holes 14 are machined by using an electrical discharge machining electrode 16 shown in FIG. 4A. The electrical discharge machining electrode 16 is integrally constituted by an electrode base portion 17 and projecting electrode portions 18. It goes without saying that the projecting electrode portions 18 correspond to the opening holes 14 of FIG. 3. As described below in connection with FIG. 4B, the electrical discharge machining electrode 16 is easily produced at a high precision. That is, for example, the electrical discharge electrode 16 can easily be produced at a high precision by cutting grooves 19, 19, . . . of a given groove width "d" at a predetermined pitch P in an electrode block 16 made of, for instance, a graphite material in orthogonally intersecting directions X and Y. The depth of the grooves 19, 19, . . . corresponds to the height (H) of the projecting electrode portions 18 shown in FIG. 4A. The pitch P and the groove width "d" are determined based on profile dimensions of the shaping grooves 13 and the opening holes 14. That is, when a length of one side of a square passing through center lines of the shaping grooves 13 and a length of one side of the opening holes 14 are expressed as $L_1$ and $L_2$, respectively [FIG. 3A], the pitch P and the groove width "d" may be set at $\sqrt{2}L_1$ and $\sqrt{2}L_1 - L_2$, respectively.

(iii) Next, a die base portion 12 as shown in FIG. 3 is produced by boring communicating holes 15, 15, . . . in the die base block prepared in the above step (i). The locations of the communicating holes 15, 15, . . . correspond to those of the opening holes 14, 14, . . . , and an inner diameter $\Phi$ of the communicating holes may be set at a value from $L_2$ to $\sqrt{2}L_2$ ($L_2$ is a length of one side of the opening hole).

(iv) The honeycomb structure forming die according to the present invention is completed by bonding the shaping section 11 and the die base portion 12 prepared in the above steps (i) through (iii), for example, by using a bonding technique such as brazing. Although it has been explained that the forming section 11 and the die base portion 12 are bonded by the brazing technique, a liquid phase diffusion welding technique used in the honeycomb structure forming dies and a process for manufacturing the same as proposed in U.S. Pat. No. 4,653,996 may be employed.

FIG. 5 shows another embodiment of the honeycomb structure forming die according to the present invention which as mentioned in the foregoing, is constituted by a forming section 11 made of a super hard alloy material without using a die base portion as shown in FIG. 3. FIG. 5A is a plan view, and FIGS. 5B and 5C are a side sectional view of FIG. 5A taken along a line V B—V B and a sectional view of FIG. 5B taken along a line V C—V C, respectively. Reference numerals of FIGS. 5A through 5C correspond to those of FIGS. 3A through 3C.

While the center lines of the forming channels 13 of the embodiment shown in FIG. 3 form squares, those of the forming channels 13 of the embodiment in FIG. 5 form rectangles. In the embodiment of FIGS. 5A through 5C the sectional profile of the opening holes 14 communicating with the forming channels is rhombic, and the communicating holes 14 are formed such that the vertexes of the rhombius position at the center lines of the shaping channels 13.

A process for manufacturing the embodiment of FIG. 5 is fundamentally the same as that of the embodiment of FIG. 3. Therefore, explanation is omitted here. The opening hole 14 of the embodiment of FIG. 5 have the rhombic sectional shape, and are arranged in parallel with arrow directions X′ and Y′ shown. Thus, an electrical discharge machining electrode (not shown) for machining the opening holes can easily be produced by cutting grooves in parallel with the arrow directions X′ and Y′.

The honeycomb structure forming dies and a method for manufacturing the same according to the present invention have been explained in the foregoing. By designing the sectional shape of the opening holes square or rhombic, the electrical discharge machining electrode used for machining the opening holes is not only easily produced, but also a distance between the opening holes can be widened as compared with dies having cylindrical opening holes of the same sectional area. Therefore, a structural strength can be increased. Although the sectional shape of the opening holes is designed square in the embodiment of FIG. 3, and rhombic in the embodiment of FIG. 5, vertexes of the square or the rhombus may be formed in an arcuate shape.

As mentioned in the foregoing, according to the present invention, since the forming section having the forming channels and the opening holes communicating therewith is made of a super hard alloy material, the structural strength of the honeycomb structure forming dies can be enhanced, and the use life of the dies can be prolonged to a large extent. Furthermore, the electrical discharge machining electrode used for machining the opening holes can be easily produced at a high precision.

What is claimed is:

1. A die for extruding honeycomb structures, comprising:
    a die body made of a super hard alloy, said die body having an entrance surface and an exit surface, said surfaces being located on opposite parallel sides of said die body;
    a plurality of intersecting forming channels formed in said exit surface in a direction substantially normal to said exit surface, said forming channels having a geometric configuration substantially corresponding to a geometric configuration of a honeycomb structure to be formed thereby; and
    a plurality of independent opening holes formed in said entrance surface in a direction substantially normal to said entrance surface such that said opening holes communicate with said forming channels;
    wherein the center of each opening hole is coaxial with an intersection of the center planes of at least two forming channels.

2. A die for extruding honeycomb structures according to claim 1, further comprising a die base portion bonded to the die body at said entrance surface thereof, said die base portion being made of a carbon steel and including longitudinal communicating holes formed therethrough in a substantially parallel direction to said opening holes, such that said communicating holes communicate with said opening holes.

3. A die for extruding honeycomb structures, comprising:
    a die body made of a super hard alloy having an entrance surface and an exit surface, said surfaces being located on opposite parallel sides of said die body;
    a plurality of intersecting forming channels formed in said exit surface in a direction substantially normal to said exit surface, said forming channels having a geometric configuration substantially corresponding to a geometric configuration of a honeycomb structure to be formed thereby; and
    a plurality of independent opening holes each having a substantially uniform cross-sectional shape substantially corresponding to a parallelogram, said holes being formed in said entrance surface in a direction substantially normal to said entrance surface such that said opening holes communicate with said forming channels;
    wherein the center of each opening hole is coaxial with an intersection of the center planes of at least two forming channels, and opposite corners of each opening hole are arranged in the center plane of at least one forming channel.

4. A die for extruding honeycomb structures according to claim 3, wherein both pairs of opposite corners of each opening hole are arranged in the center planes of at least two forming channels.

5. A die for extruding honeycomb structures according to claim 3, further comprising a metallic die base portion bonded to the die body at said entrance surface thereof, said die base portion including longitudinal communicating holes formed therethrough in a substantially parallel direction to said opening holes, such that said communicating holes communicate with said opening holes.

6. A die for extruding honeycomb structures according to claim 3, wherein said plurality of independent opening holes each have a substantially uniform cross-sectional shape substantially corresponding to a rectangle.

7. A die for extruding honeycomb structures according to claim 3, wherein said plurality of independent opening holes each have a substantially uniform cross-sectional shape substantially corresponding to a square.

8. A die for extruding honeycomb structures according to claim 3, wherein said plurality of independent opening holes each have a substantially uniform cross-sectional shape substantially corresponding to a rhombus.

* * * * *